INVENTOR
ALBERT M. NAULTY
BY
Seidel & Gonda
ATTORNEYS.

INVENTOR
ALBERT M. NAULTY
BY
Seidel & Gonda
ATTORNEYS.

United States Patent Office 3,545,881
Patented Dec. 8, 1970

3,545,881
CONTROLLABLE PITCH PROPELLER WITH HYDRAULIC POWER SUPPLY AND CONTROL
Albert M. Naulty, Springfield, Pa., assignor to Baldwin-Lima-Hamilton Corporation, Philadelphia, Pa., a corporation of Delaware
Filed July 24, 1968, Ser. No. 747,327
Int. Cl. B64c 11/38
U.S. Cl. 416—157
9 Claims

ABSTRACT OF THE DISCLOSURE

A controllable pitch propeller of the type employing a hydraulically actuated servomotor mechanism for adjusting blade pitch, wherein fluid pressure for adjusting blade pitch is provided by apparatus within and driven by the propeller shaft, thereby obviating the need for high pressure overshaft seals between fixed structure and the shaft. The fluid pressure providing apparatus is so arranged that only the pressure and volume needed to maintain pitch is provided during steady state operation. An eccentric cam ring, against which radially disposed shaft-mounted pistons ride, controls the stroke of the pistons to regulate the volume delivered to the pitch change servomotor.

---

This invention relates to contollable pitch propellers with hydraulic power supply and control. More particularly, this invention relates to an improved controllable pitch propeller construction wherein a shaft-mounted hydraulic power supply provides the fluid pressure requirements for maintaining and changing blade pitch.

Adjustable pitch marine propellers require adjusting forces of considerable magnitude. Thus, pitch change mechanisms sufficiently compact to be contained in the propeller hub requires operating fluid under very high pressure. With conventional prior art constructions, this has required the transfer of high pressure fluid from stationary to rotating parts through an external manifold. Such a manifold necessitates the use of high pressure overshaft seals between the manifold and shaft. Alternatively, it has been proposed to employ an in-shaft pump driven by an electric motor, as in the Obrist patent, No. 2,523,053, or planetary gears. The latter two alternatives have not been found wholly satisfactory, since one requires an addition to the shaft and propeller mechanism of electrical service connections, and the other calls for numerous mechanical parts. Another shortcoming of prior art pitch change mechanisms has been the tendency of the blades to flatten pitch as inevitable slight leakage occurs in the mechanism's hydraulic components.

A general object of the present invention is to provide improved means whereby fluid at high operating pressures may be supplied to a propeller blade adjusting servomotor.

Another object of the present invention is to provide an improved means for supplying operating pressures to blade adjusting servomotors, the means having a high degree of compactness, and being relatively economical to manufacture and maintain by virtue of its having few and relatively simple operating parts.

A still further object of the persent invention is to provide a means for supplying operating pressures for a controllable pitch propeller, wherein fluid is constantly supplied to compensate for leakage and to hold pitch during steady state operation of the propeller.

It is a further object of this invention to provide means for generating high pressure hydraulic fluid for use in a controllable pitch propeller without need of conventional mechanical gear drives, electric motor drives, or high pressure overshaft dynamic seals.

Other objects will appear hereinafter.

The foregoing and other objects are provided in a preferred embodiment by a high pressure pump integral with, and driven by the propeller shaft. The pump is preferably of the piston-type, with multiple numbers of pistons located in radical bores in the shaft. The pistons ride against stationary cam rings, which when transversely offset, cause the pistons to move in and out in the bores, thus generating pressure. Proper directional hydraulic flow is produced by flow directing valves, also rotating with the shaft. The flow directing valves may be positioned by the same stationary cam rings as the pumping pistons, or by their own stationary ring. The rings and pump pistons are in matched, oppositely disposed sets so that their reaction loads are self-contained and balanced, thereby creating no external forces on the supporting housing. The present arrangement permits the use of low pressure overshaft seals in the housing to supply oil to a shaft suction reservoir.

For the purpose of illustrating the invention there is shown in the drawings a form which is presently preferred; it being understood, however, that this invention is not limited to the precise arrangements and instrumentalities shown.

Figure 1:
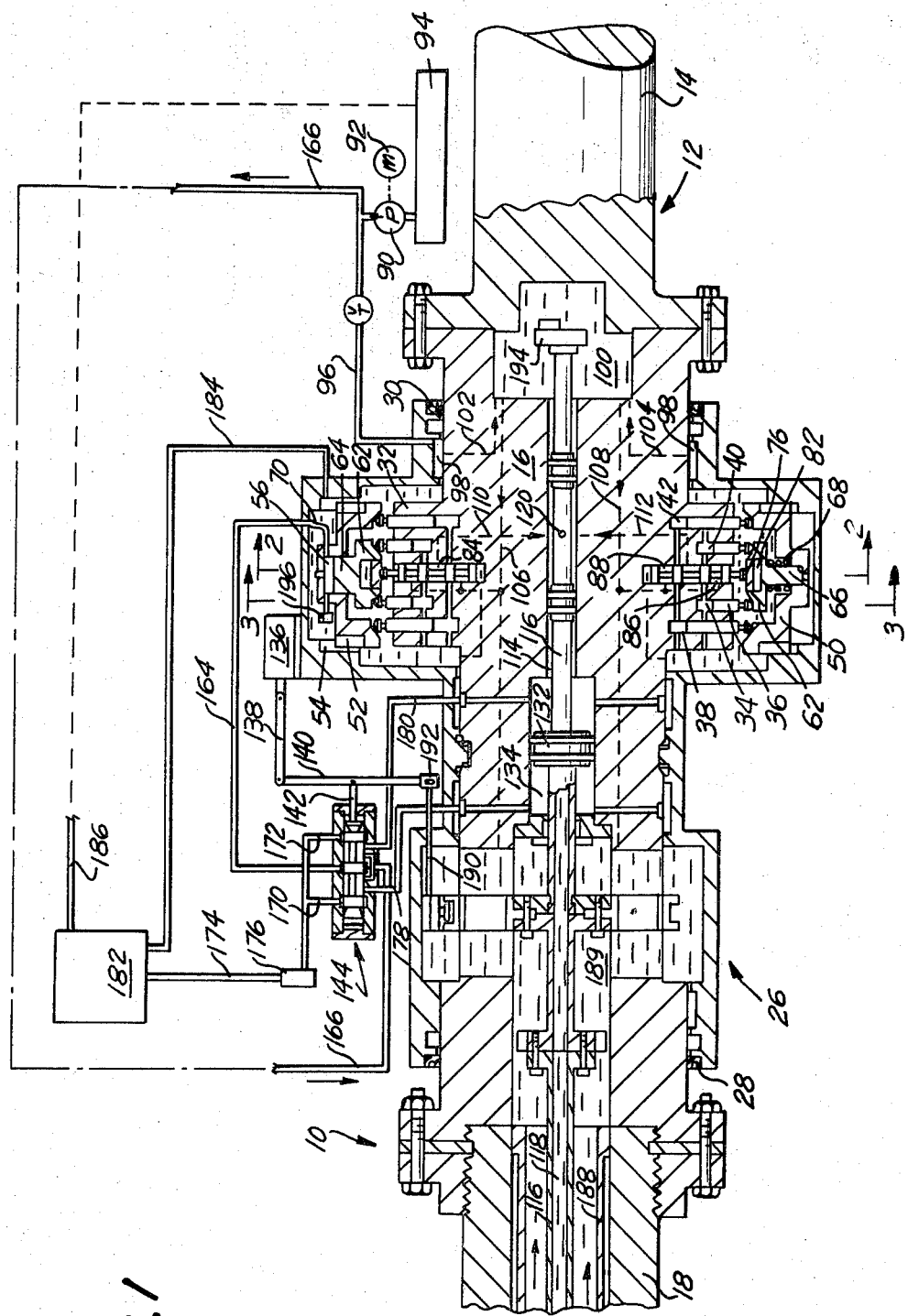
FIG. 1 is a longitudinal cross-sectional view showing a portion of a propeller shaft incorporating the present hydraulic power supply and control.

Referring now to the drawings in detail, wherein like numerals indicate like elements, there is seen in FIG. 1 a controllable pitch propeller hydraulic supply and control system, designated generally by the reference numeral 10. There is seen is FIG. 1 a shaft, designated generally by the numeral 12. As illustrated, the shaft 12 is constructed in three longitudinal sections, namely sections 14, 16 and 18. It should be understood that specific shaft constructions, other than the three-section construction shown, can be used if desired.

Figure 4:
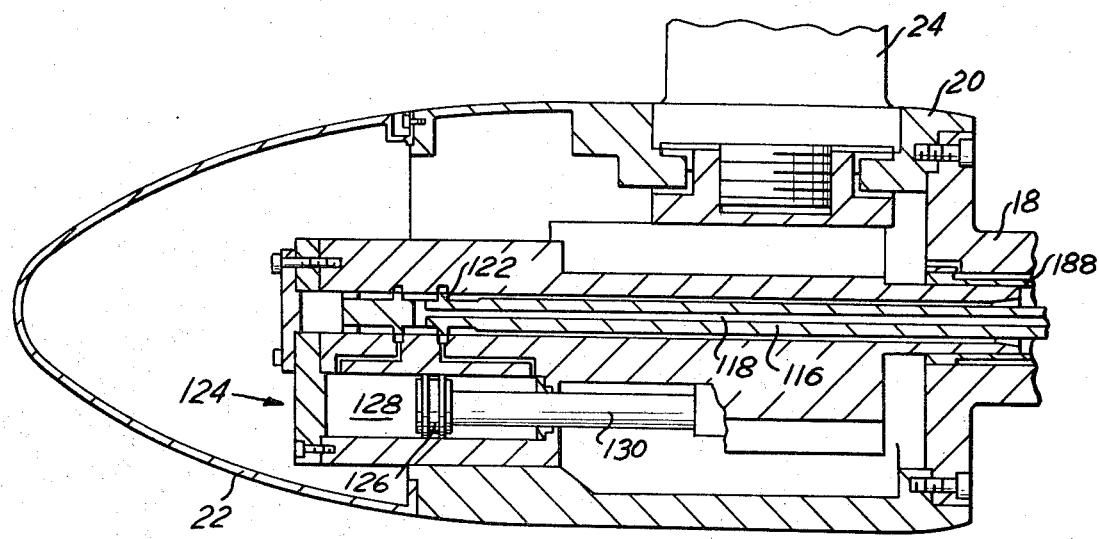
FIG. 4 is a longitudinal, cross-sectional view showing a propeller hub suitable for use in conjunction with the present invention.

Referring to FIG. 4, shaft section 18 is secured to a hub 20 in any conventional manner. The usual fairing 22 is secured to the remote end of the hub 20. Propeller blades 24, of which only one is shown, are rotatably mounted in the hub 20. Blades 24 are mounted for rotation about axes extending radially from the longitudinal axis of the shaft 12. The number of blades to be used in any given propeller is a matter of choice. It should be understood that the propeller, per se, is not a novel aspect of the present invention.

A housing, designated generally by the reference numeral 26, is disposed about the shaft 12. The housing 26 is a part of the fixed shaft-supporting structure within which the shaft 12 rotates. Seals 28, 30 are provided at opposite ends of the housing 26 in sliding contact with the periphery of the shaft 12.

Figure 3:
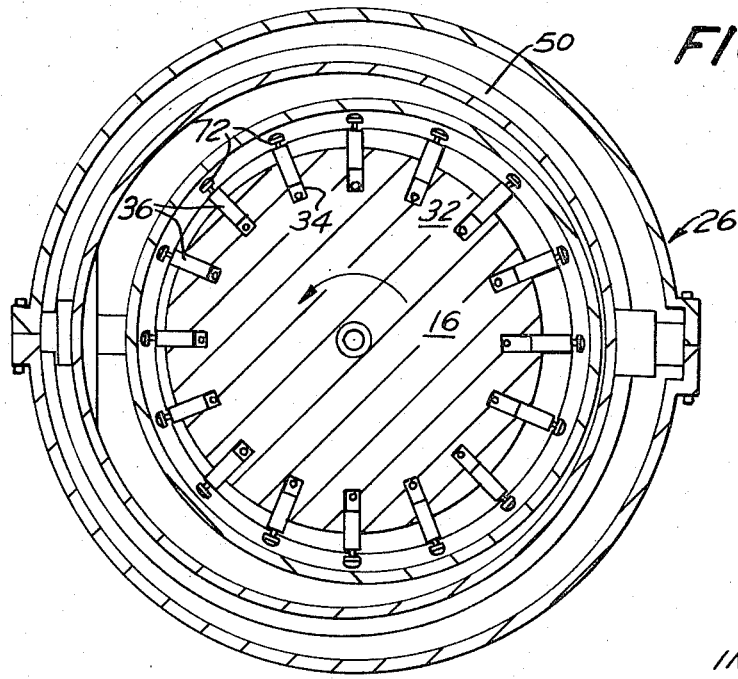
FIG. 3 is a transverse, cross-section view taken along the line 3—3 in FIG. 1.

Referring now to FIGS. 1 and 3, the shaft section 16 includes an enlarged peripheral portion 32 having circumferentially spaced, radially extending bores 34 therein. Pistons 36 are slidably received in the bores 34. As is apparent from FIG. 1, rows of bores in addition to the bores 34 may be provided. Thus, bores 38, 40 and 42 may be provided in the enlarged shaft portion 32 at axially spaced locations. For reasons to be explained later, an even multiple of rows of bores, such as four, is preferred.

Corresponding bores 34, 36, 40 and 42 in each row are preferably axially aligned.

Figure 2:
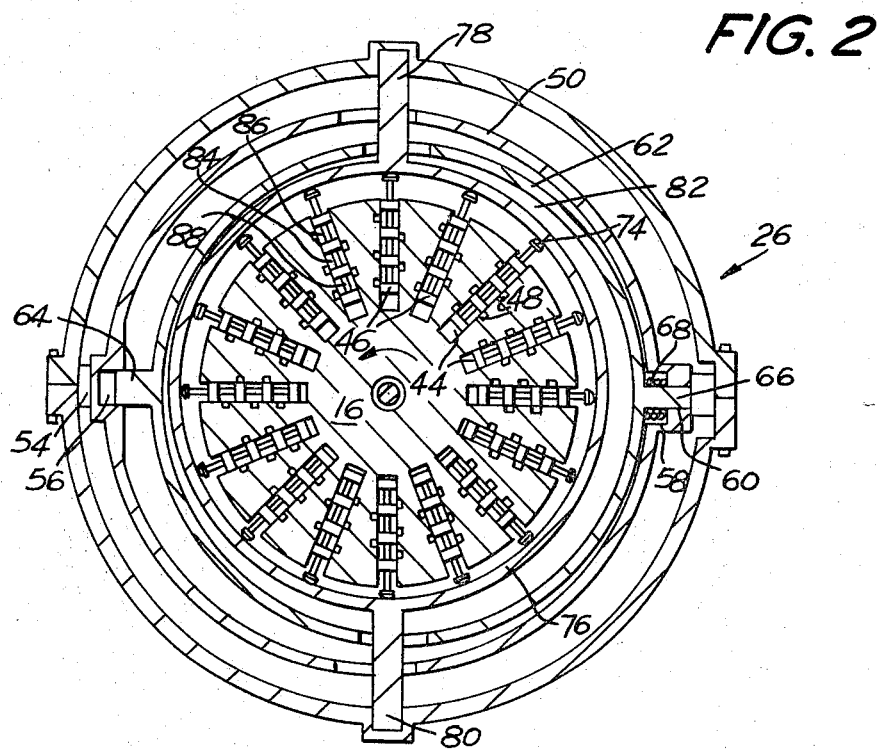
FIG. 2 is a transverse, cross-section view taken along the line 2—2 in FIG. 1.

Referring now to FIG. 2, the enlarged shaft portion 32 also includes circumferentially spaced, radially extending bores 44. The bores 44 are in axial alignment with the previously described bores 34, 38, 40 and 42, and each set of the previously described bores is provided with a bore 44. A four-land spool valve 46 is slidably received in each of the bores 44. The bores 44 are provided with suitable ports 48, to be described in more detail later.

Referring to FIGS. 1, 2 and 3, an outer cam ring 50 is non-rotatably coupled to the housing 26. The outer cam ring 50 is mounted in the housing 26 for sliding in a direction perpendicular to the axis of rotation of the shaft 12. Tongues 52 on the outer cam ring 50, adapted to mate with grooves 54 on the housing 26, constrain the cam ring 50 for sliding in the desired direction.

The outer cam ring 50 is provided with a radially directed cylinder 56 adjacent one of the tongues 52. At a point opposite the cylinder 56 the outer cam ring 50 is provided with concentric step bores 58, 60. An inner cam ring 62 is provided within the outer cam ring 50. The inner cam ring 62 is coupled to the outer cam ring 50 by a piston 64 received in the cylinder 56, and a stub shaft 66 complemental with the bore portion 60 on the outer cam ring 50. A compression spring 68 is received in the bore portion 58.

Referring to FIG. 2, it should now be apparent that the compression spring 68 in the bore portion 58 is effective to bias the inner cam ring 62 to the left in FIG. 2, and the outer cam ring 50 to the right by an equal amount. Thus, the spring 68 is effective to drive the cam rings 50 and 62 from the position shown in FIG. 2 to a position wherein their lefthand sides in FIG. 2 are closely spaced, and their righthand sides in the figure are widely spaced. Admission of fluid to the cylinder 56, however, causes the cam rings 50 and 62 to assume the position shown in FIG. 2. In such a position, the spring 68 is compressed. To recapitulate, admission of fluid to the cylinder 56 is effective to shift the outer cam ring 50 to the left as seen in FIG. 2, and the inner cam ring 62 to the right by an equal amount. A flexible conduit 70, seen is FIG. 1, may be provided to feed fluid into the cylinder 56.

Referring to FIGS. 1 and 3, each of the pistons is provided with a cam follower head. For example, the pistons 36 are provided with cam follower heads 72.

Referring to FIG. 3, as the shaft section 16 undergoes a single rotation, each of the cam follower heads 72 traverses the surface of the inner cam ring 62. Similarly, the pistons, not numbered, in the bores 40 traverse the inner cam ring 62. The pistons, not numbered, in the bores 38 and 42 traverse the outer cam ring 50 in a similar manner. For each rotation of the shaft 12, each of the pistons moves in and out once in its bore. Thus, there is one pumping stroke per revolution per piston. The pumping stroke of the pistons associated with the outer cam ring 50 occurs 180° away from the corresponding stroke of the pistons associated with the inner cam ring 62.

Proper directional hydraulic flow is produced by the spool valves 46, which are of the 4-land type.

Referring to FIG. 2, the spool valves 46 are provided with cam follower heads 74. A third cam ring 76 is mounted in the housing 26 in eccentric relation to the shaft 12, for example, by a pair of oppositely extending trunnions 78, 80. As is evident from FIGS. 1 and 2, the sides of the third cam ring 76 are received in and retained by an annular groove 82 in the inner cam ring 62. Between the two middle lands of the 4-land spool valves 46 are pressure chambers 84. Between the outer lands and the middle lands are suction chambers 86, 88. When the spool valve is deflected inwardly from the position shown in FIG. 1, fluid from fluid reservoir is being delivered through the appropriate port 48 and suction chamber 86 to the pistons 36 associated with the inner cam ring 62.

At the same time, pressurized fluid from the pistons associated with the outer cam ring 50 is passing through the appropriate ports 48 and the pressure chamber 84 associated with the pressure chamber 84. The situation is reversed when the shaft 12 is rotated 180°. At that time, the spool valves 46 move outwardly in their cylinders 44. Fluid then passes through the suction chamber 88 to the pistons associated with the outer cam ring 52. Pressurized fluid is received through the pressure chamber 84 from the pistons 36 associated with the inner cam ring 62.

A pump 90, driven by an auxiliary motor 92 or other means, provides low pressure fluid for the suction chambers 86 and 88. In the illustrated embodiment, the pump 90 feeds fluid from an external reservoir 94 through a conduit 96 to a low-pressure manifold 98 in the housing 26. An internal reservoir 100 is formed in the shaft 12 between the shaft sections 14 and 16. Conduits, of which the conduits 102 and 104 are exemplary, conduct fluid from the low pressure manifold 98 to the internal reservoir 100. Further conduits, of which the conduits 106 and 108 in FIG. 1 are typical, direct fluid from the internal reservoir 100 to the suction chambers 86, 88. Conduits 110, 112 communicate with the pressure chambers 84 and conduct pressurized fluid from the cylinders 34, 38, 40 and 42 to a central bore 114 in the shaft section 16.

A control rod 116 slides longitudinally in the central bore 114. As is evident at the left in FIG. 1, and also in FIG. 4, the control rod 116 is itself hollow, and has a central bore 118. An orifice 120 in the control rod 116 permits entry of pressurized fluid from the conduit 110 into the central bore 118.

Referring to FIG. 4, fluid from the bore 118 can be directed, by means of a spool valve 122 disposed at a distal end of the control rod 116, to a servomotor 124. Thus, fluid from the central bore 118 can be directed to either side of a piston 126 in a servo cylinder 128. The piston rod 130 coupled to the piston 126 actuates the propeler blade 24 in a known manner. For example, the propeler blades may be actuated in the manner described in the patent to R. R. Willi, No. 2,913,057. A control piston 132 is fixed to the control rod 116, and is received in a control cylinder 134 in the shaft section 16.

An important aspect of the present invention is the manner in which the pistons in axial bores 34, 38, 40, 42 normally deliver only sufficient pressurized fluid to compensate for leakage in the system, but deliver the full volume necessary to accomplish pitch changes in response to pitch change signals. Pitch change signals may originate from any well known control means provided at an operator's station in the vessel. The pitch change signal is effective to operate a pitch controller 136, shown diagrammatically. The pitch controller 136 has an output lever 138, whose movement is proportional to the pitch change signal. The output lever 138 is pinned in turn to a control lever 140. The control lever 140 is at a medial portion to the spool 142 of a pilot valve, designated generally by the reference numeral 144.

Figure 5:
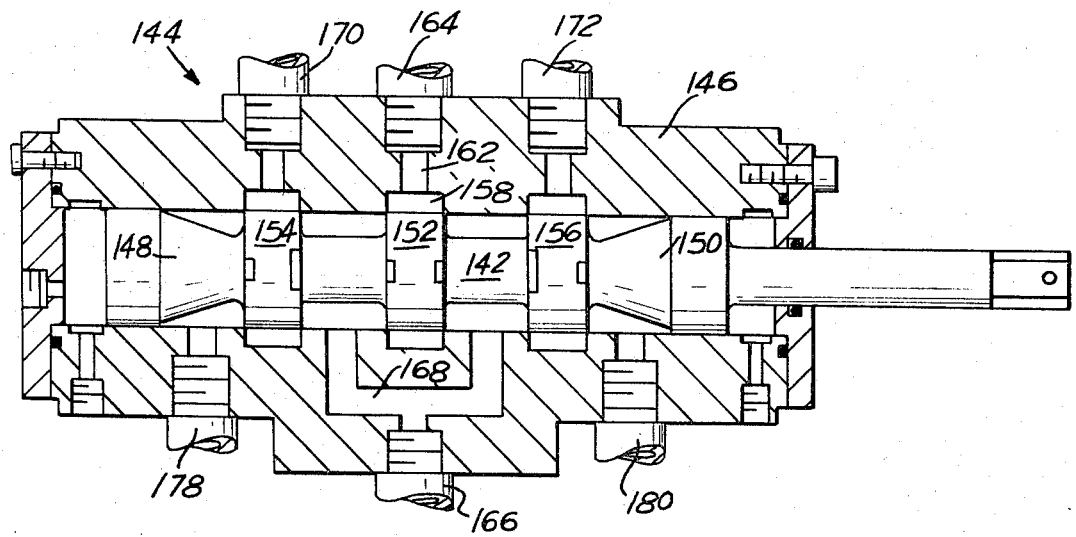
FIG. 5 is a longitudinal, cross-sectional view taken through a pilot control valve for use in the present invention.

The pilot valve 144 is seen in greater detail in FIG. 5. Referring to FIG. 5, the pilot valve 144 includes a cylindrical casing 146, within which the aforementioned spool 142 is received. Spool 142 of pilot valve 144 has five sealing lands. The end lands 148 and 150 act as the seals for return flow and provide guiding surfaces for the spool 142. The chambers defined by the central land 152 and the intermediate lands 154 and 156 are control fluid feed chambers. When the spool 142 is in a neutral position, the central land 152 is juxtaposed with a groove 158. The groove 158 feeds said outlet opening 160. The central land 152 and groove 158 have "negative lap" to provide a constant controlled bleed of fluid around the central land 152. The groove 158 communicates, by means of an outlet port 162 and conduit 164 with the previously mentioned flexible conduit 70 and the cam ring control cylinder 56. Control fluid is provided for the pilot valve 144 through a supply conduit 166 coupled to the pump 90. The supply conduit 166 is in fluid communication with a branched conduit 168 opening into the chambers between the central land 152 and intermediate lands 154 and 156. Also coupled to the pilot valve 144 are return conduits 170 and 172, which meet in a common return conduit 174. The common return conduit 174 has a one-way check valve 176 therein.

Conduits 178 and 180, which serve to supply operating fluid to the control cylinder 134, are also coupled to the pilot valve 144. The conduits 178 and 180 are coupled to the pilot valve 144 at points between the central land 152 and intermediate lands 154 and 156 of the spool 142. The conduits 178 and 180 are also coupled to the control cylinder 134 at respective sides of the control piston 132.

The common return conduit 174 empties into a return sump 182. Also emptying into the return sump 182 is a conduit 184 from the housing 26, adjacent the operating cylinder 56 for the outer and inner cam rings 50, 62. A conduit 186 laces the sump 182 in fluid communication with the external reservoir 94.

Referring to FIGS. 1 and 4, return fluid from the servo cylinder 128 passes around the exterior of the control rod 116, within a bushing 188, and then to a return chamber 189.

Referring again to FIG. 1, a feed back lever 190 is coupled by means of a sliding connection 192 to the lower end of previously described control lever 140, and to the control rod 116. Thus, movement of the control rod 118 in response to control signals is transmitted back to the control lever 140, thereby neutralizing the pilot valve 144 and ending adjusting movement of the propeller blades 124. An end of the control 116 projecting into the internal reservoir 100 is preferably provided with a safety relief valve 194. The safety relief valve 194 protects the system from over-pressure. A relief valve 196 is provided for the cylinder 56 by which the outer cam ring and inner cam ring 50, 62 are operated. The relief valve 196 may take the form of a bleed hole and adjustable needle valve. Adjustment of the needle valve is made to balance the ffow of oil bleeding from the central land 152 of the pilot valve spool 142, thereby preventing pressure build-up. When the central land 152 is in its central position, the pistons 36 are on minimum stroke, maintaining only that flow in the system necessary to offset leakage and hold the system pressure. In effect, the hydraulic system is unloaded.

In view of the foregoing description, it is believed the operation of the present apparatus is evident. Nevertheless, the operation will now be described in detail.

Assuming the above-described unloaded conditions, reception of a control signal by the pitch controller 136 results in translation of the output lever 138 to the left or right in FIG. 1. Movement of the output lever 138 causes rotation of the control lever 140 about the sliding connection 192. Such rotation of the lever 140 causes displacement of the spool 142 of pilot valve 144. Displacement of the spool causes the flow of control fluid through conduit 164 to the cam ring actuating cylinder 56. Thus, the inner and outer cam rings 50, 62 are moved to positions of pronounced eccentricity, thereby increasing the stroke of the pistons 36 in their respective cylinders.

Displacement of the spool 142 also results in flow of control fluid through one or the other of the conduits 178, 180, with consequent movement of the control piston 132 and control rod 116. Referring to FIG 4, movement of the control rod 116 moves the spool valve 122 coupled to its end, and permits entry of high pressure fluid into the servo cylinder 128 of servomotor 124.

Referring again to FIG. 1, the pump 90 also feeds fluid through the conduit 96 to the low pressure manifold 98 and then to the internal reservoir 100 through conduits 102, 104. From the internal reservoir 100 fluid passes through conduits 106, 108 to the suction chambers 86, 88 defined by spool valves 46. Upon deflection of the spool valves 46 by contact with their cam rings 76, fluid is routed from the suction chambers to the pistons 36 undergoing suction strokes, thereby filling the cylinders of such pistons. Simultaneously, the pressure chambers 84 of the spool valves 46 receive pressurized fluid from pistons 36 engaged in pumping strokes. Pressurized fluid passes through the conduit 110, the orifice 120, and the central bore 118 of the control rod 116. The pressurized fluid flows past the now deflected spool valve 122 into the servo cyilnder 128. Fluid from the return side of the servo cylinder passes outwardly around the control rod 116 within the bushing 188, and then to the return chamber 189. From the return chamber 189 the fluid may be fed again to the conduits 106, 108.

Fluid from the return side of the control piston 132 passes through one or the other of the conduits 178, 180 to one or the other of the return conduits 170, 172, and finally to the common return conduit 174.

Movement of the control rod 116 is transmitted by means of the feedback lever 190 to the control lever 140. Such movement neutralizes the spool 142 once again, thereby returning the outer and inner cam rings 50, 62 to the positions of minimum eccentricity.

It will be appreciated that the number of rows of pistons 36 and cylinders is variable. Even numbers of rows, however, permit balancing of loads on the outer and inner cam rings, however, permit balancing of loads on the outer and inner cam rings 50, 62, with uniform diameter pistons. It should be appreciated that the herein described arrangement of cam rings 50, 62 also results in balancing of the reaction loads between the cam rings, so that a minimum of external force is passed from the cam rings to the housing 26.

As used hereinafter, the pistons 36 and cylinders 34, 38, 40, 42 may be referred to collectively as a hydraulic pump. Also, the outer and inner cam rings 50 and 62 may be referred to as "first" and "second" cam rings, respectively. Pilot valve 144 may be denoted for convenience as a common source of fluid for the cylinder 56 and control cylinder 134.

The present invention may be embodied in other specific forms without departing from the spirit or essential attributes thereof and, accordingly, reference should be made to the appended claims, rather than to the foregoing specification as indicating the scope of the invention.

It is claimed:

1. In a controllable pitch propeller of the type having a plurality of blades pivotably coupled to a propeller shaft and hydraulically actuated pitch change servomotor means coupled to said blades, hydraulic power supply and control means for said servomotor comprising a variable displacement hydraulic pump in said shaft and rotatable therewith, a nonrotatable housing disposed about said shaft, pump actuator means in said housing for actuating said pump, said pump actuator means having a first position wherein the displacement of said pump is such that said pump provides only a volume of fluid sufficient to maintain the pitch of said blades and replace fluid leakage, and a second position wherein the displacement of said pump is such that said pump provides a volume of fluid sufficient to accomplish a pitch change, flow control valve means in said shaft for directing fluid to said cylinders and receiving pressurized fluid therefrom for direction to said servomotor, valve actuator means in said housing for actuating said flow control valve means, and remotely operable control means coupled to said pump actuator means for selectively positioning said actuator means.

2. In a controllable pitch propeller in accordance with claim 1, said hydraulic pump comprising a plurality of radially extending bores in said shaft, pistons reciprocably received in said bores, cam follower means on distal ends of said pistons, said pump actuator means comprising cam ring means coupled to said housing and in sliding contact with said cam follower means, said control means being coupled to said cam ring means for moving said cam ring means transversely with respect to said housing to locations eccentric with respect to said shaft, said cam ring means being disposed in said first position of said actuator means at a location of minimum eccentricity with respect to said shaft, and said cam ring means being disposed in said second position of said actuator means at a location of greater eccentricity with respect to said shaft than the minimum.

3. In a controllable pitch propeller in accordance with claim 2, said bores being disposed in a plurality of axially spaced rows in said shaft, said cam ring means comprising a first cam ring slidably coupled to said housing and in juxtaposition to the cam followers of first rows of pistons for contact therewith, a second cam ring slidably coupled to said first cam ring and juxtaposed to the cam followers of second rows of pistons for contact therewith, and means coupled to said first and second cam rings for biasing said cam rings to said first position, said control means comprising means coupled to said cam rings for moving said cam rings to said second position.

4. In a controllable pitch propeller in accordance with claim 1, wherein said pitch servomotor is a hydraulic motor, said control means coupled to said pump actuator means comprising a hydraulic cylinder, a control element for conditioning said pitch change servomotor to receive fluid, a common source of hydraulic fluid for selectively supplying fluid to said control means coupled to said pump actuator means and said control element, and conduit means coupling said hydraulic pump and said pitch change servomotor, whereby actuation of said pitch change servomotor is responsive to supplying of fluid from said common source to said control means and said control element.

5. In a controllable pitch propeller in accordance with claim 4, said common source of hydraulic fluid comprising a valve having a normal controlled fluid leakage therethrough to said hydraulic cylinder, and said hydraulic cylinder having means providing a selective controlled leakage therefrom.

6. In a controllable pitch propeller in accordance with claim 5, means for sensing the position of said control element, said means being coupled to said valve for returning said valve to a neutral position in response to movement of said control element.

7. In a controllable pitch propeller in accordance with claim 2 wherein said pitch change servomotor is a hydraulic motor, said control means coupled to said pump actuator means comprising a hydraulic cylinder, a control element for conditioning said pitch change servomotor to receive fluid, a common source of fluid for selectively supplying fluid to said control means coupled to said pump actuator means and said control element, said common source of fluid comprising a valve having a normal controlled fluid leakage to said hydraulic cylinder, said hydraulic cylinder having means providing a selective controlled leakage therefrom, and conduit means coupling said hydraulic pump and said pitch change servomotor, whereby actuation of said pitch change servomotor is responsive to supplying of fluid from said common source to said control means and said control element.

8. In a controllable pitch propeller in accordance with claim 2, said flow control valve means comprising a plurality of radially disposed reciprocable valve members having cam followers at distal ends thereof, said valve actuator means comprising a fixed cam ring mounted in said housing in eccentric relation with respect to said shaft, said cam followers on said valve members being in engagement with said fixed cam ring.

9. In a controllable pitch propeller in accordance with claim 3, said flow control valve means comprising a plurality of radially disposed reciprocable valve members having cam followers at distal ends thereof, said valve actuator means comprising a fixed cam ring mounted in said housing in eccentric relation with respect to said shaft, said cam followers on said valve members being in engagement with said fixed cam ring.

References Cited

UNITED STATES PATENTS

| | | | |
|---|---|---|---|
| 2,023,785 | 12/1935 | Hoover | 170—160.31(P)UX |
| 2,346,979 | 4/1944 | Lilley | 170—160.31(P)UX |
| 2,404,290 | 7/1946 | Hoover | 170—160.31(P)UX |
| 2,812,026 | 11/1957 | Braddon | 170—160.32X |
| 3,004,609 | 10/1961 | Naulty | 170—160.32 |
| 3,053,267 | 9/1962 | Burnham | 170—160.32UX |
| 3,156,301 | 11/1964 | Biermann | 170—160.32X |

EVERETTE A. POWELL, JR., Examiner